US009797502B2

(12) United States Patent
Hayes et al.

(10) Patent No.: US 9,797,502 B2
(45) Date of Patent: Oct. 24, 2017

(54) AXLE ASSEMBLY HAVING A LUBRICANT RESERVOIR

(71) Applicant: ArvinMeritor Technology, LLC, Troy, MI (US)

(72) Inventors: Brian D. Hayes, Newark, OH (US); Robert J. Martin, Newark, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 24 days.

(21) Appl. No.: 15/077,970

(22) Filed: Mar. 23, 2016

(65) Prior Publication Data

US 2017/0276232 A1    Sep. 28, 2017

(51) Int. Cl.
*F16H 57/04* (2010.01)
*F16H 48/08* (2006.01)

(52) U.S. Cl.
CPC ........... *F16H 57/045* (2013.01); *F16H 48/08* (2013.01); *F16H 57/0423* (2013.01); *F16H 57/0424* (2013.01); *F16H 57/0457* (2013.01); *F16H 57/0471* (2013.01); *F16H 57/0483* (2013.01)

(58) Field of Classification Search
None
See application file for complete search history.

(56) References Cited

U.S. PATENT DOCUMENTS 3,715,936 A * 2/1973 Jones ...................... F16H 48/08
475/246
4,157,045 A * 6/1979 Suzuki ................ F16H 57/0469
184/6.12
2004/0224809 A1 * 11/2004 Hayes ................... B60B 35/002
475/160
2006/0100053 A1 * 5/2006 Asahi .................. F16H 57/0483
475/221
2010/0105513 A1 * 4/2010 Hilker .................... F16H 48/38
475/160
2011/0212805 A1 * 9/2011 Hilker ................. F16H 57/0483
475/160
2013/0001018 A1 * 1/2013 Masuda .............. F16H 57/0426
184/6.12
2014/0243137 A1   8/2014 Kwasniewski et al.
2015/0354691 A1  12/2015 Keeney et al.
(Continued)

FOREIGN PATENT DOCUMENTS

DE         3023439 A1 *  1/1981  ............ B60K 17/16
EP         2551554 A1     1/2013
(Continued)

OTHER PUBLICATIONS

United States Patent and Trademark Office, U.S. Appl. No. 14/851,000, filed Sep. 11, 2015.
(Continued)

*Primary Examiner* — Justin Holmes
*Assistant Examiner* — Timothy M Hannon
(74) *Attorney, Agent, or Firm* — Brooks Kushman P.C.

(57) ABSTRACT

An axle assembly having a lubricant reservoir. A bearing cap may be disposed on first and second legs of a differential carrier. The first leg and the bearing cap may cooperate to define at least a portion of a lubricant reservoir. A lubricant passage may extend through the first leg to provide lubricant from the lubricant reservoir to a first roller bearing assembly.

19 Claims, 4 Drawing Sheets

(56) References Cited

U.S. PATENT DOCUMENTS

2016/0290484 A1   10/2016   Lenczewski et al.
2016/0377168 A1 * 12/2016   Nahrwold ............... F16H 48/08
                                                          475/160

FOREIGN PATENT DOCUMENTS

JP      2006342890 A  * 12/2006   ......... F16H 57/0421
JP      2008089040 A     4/2017

OTHER PUBLICATIONS

United States Patent and Trademark Office, U.S. Appl. No. 14/851,004, filed Sep. 11, 2015.
European Patent Office, Extended European Search Report for the corresponding European Patent Application No. 16204028.1 dated Jun. 13, 2017.

* cited by examiner

AXLE ASSEMBLY HAVING A LUBRICANT RESERVOIR

TECHNICAL FIELD

This disclosure relates to an axle assembly having a lubricant reservoir.

BACKGROUND

An axle assembly and method of differential lubrication control is disclosed in U.S. Patent Application No. 2014/0243137.

SUMMARY

In at least one embodiment, an axle assembly is provided. The axle assembly may have a differential carrier, a bearing cap, and a differential unit. The differential carrier may have a first leg and a second leg. The first and second legs may cooperate to at least partially define an opening that receives a first roller bearing assembly. The first leg may at least partially define a lubricant reservoir and a lubricant passage. The lubricant passage may extend from the lubricant reservoir to the opening. The bearing cap may be disposed on the first and second legs and may cooperate with the first and second legs to define the opening. The differential unit may have a differential case. The differential case may be rotatably supported by the first roller bearing assembly such that the differential case rotates about an axis. Lubricant in the lubricant reservoir may pass through the lubricant passage to lubricate the first roller bearing assembly and to enter the differential case to lubricate the differential unit.

In at least one embodiment, an axle assembly is provided. The axle assembly may include a differential carrier, a bearing, a bearing support, and a differential unit. The differential carrier may have a first leg and a second leg. The first and second legs may extend from a side wall of the differential carrier and may cooperate to at least partially define an opening that receives a first roller bearing assembly. The first leg may be disposed above the second leg and may at least partially define a lubricant reservoir and a lubricant passage. The lubricant passage may extend from the lubricant reservoir to the opening. The bearing cap may be disposed on the first and second legs and may cooperate with the first and second legs to define the opening. The bearing support may be disposed on the differential carrier. A second roller bearing assembly may be disposed on the bearing support. The differential unit may be operatively coupled to a first axle shaft and a second axle shaft. The first and second axle shafts may rotate about an axis and may each be configured to support a corresponding wheel. The differential unit may compensate for rotational speed differences between the first axle shaft and the second axle shaft. Differential unit may have a differential case that may be rotatably supported by the first roller bearing assembly and the second roller bearing assembly. The differential case may have a lubricant outlet hole that may be disposed adjacent to the second roller bearing assembly. Lubricant in the lubricant reservoir may pass through the lubricant passage to enter the first roller bearing assembly and differential case. Lubricant may exit the differential case through the lubricant outlet hole to lubricate the second roller bearing assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
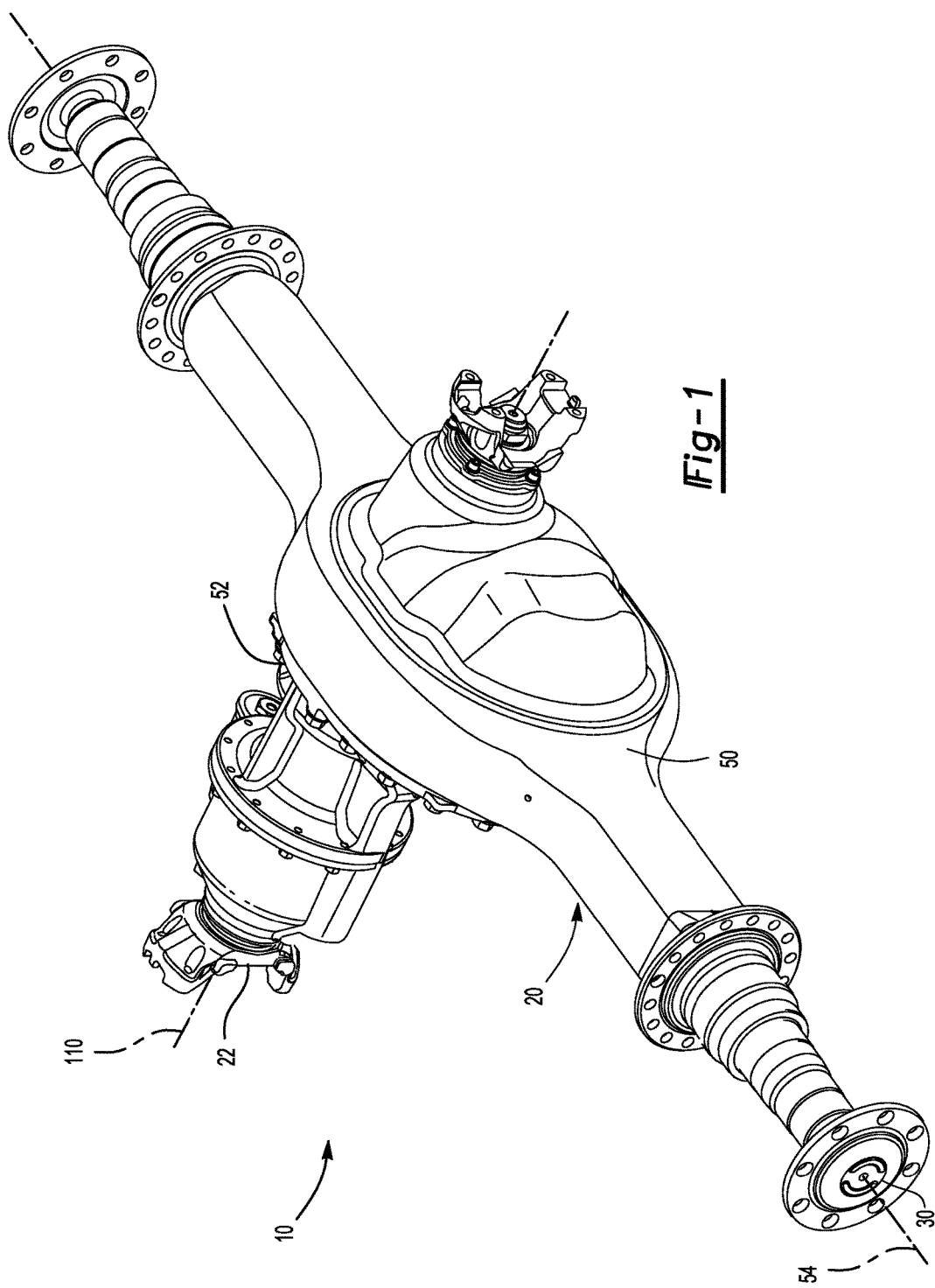
FIG. 1 is a perspective view of an axle assembly.

Referring to FIG. 1, an exemplary axle assembly 10 is shown. The axle assembly 10 may be provided with a vehicle, such as a motor vehicle like a truck, bus, farm equipment, military transport or weaponry vehicle, or cargo loading equipment for land, air, or marine vessels. The axle assembly 10 may be configured to provide torque to at least one associated wheel assembly.

Figure 2:
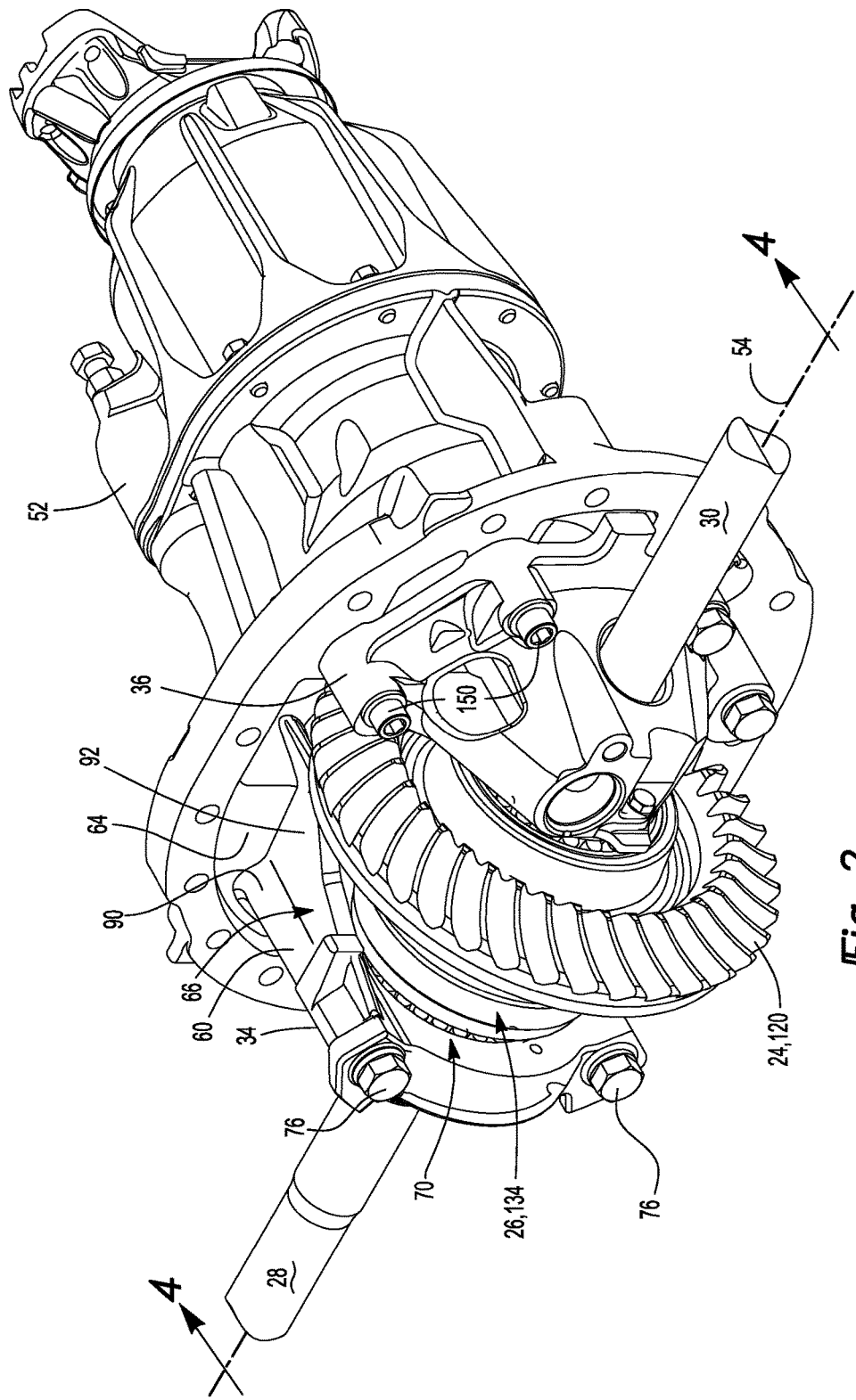
FIG. 2 is a perspective view of a differential carrier of the axle assembly and associated components.
Figure 3:
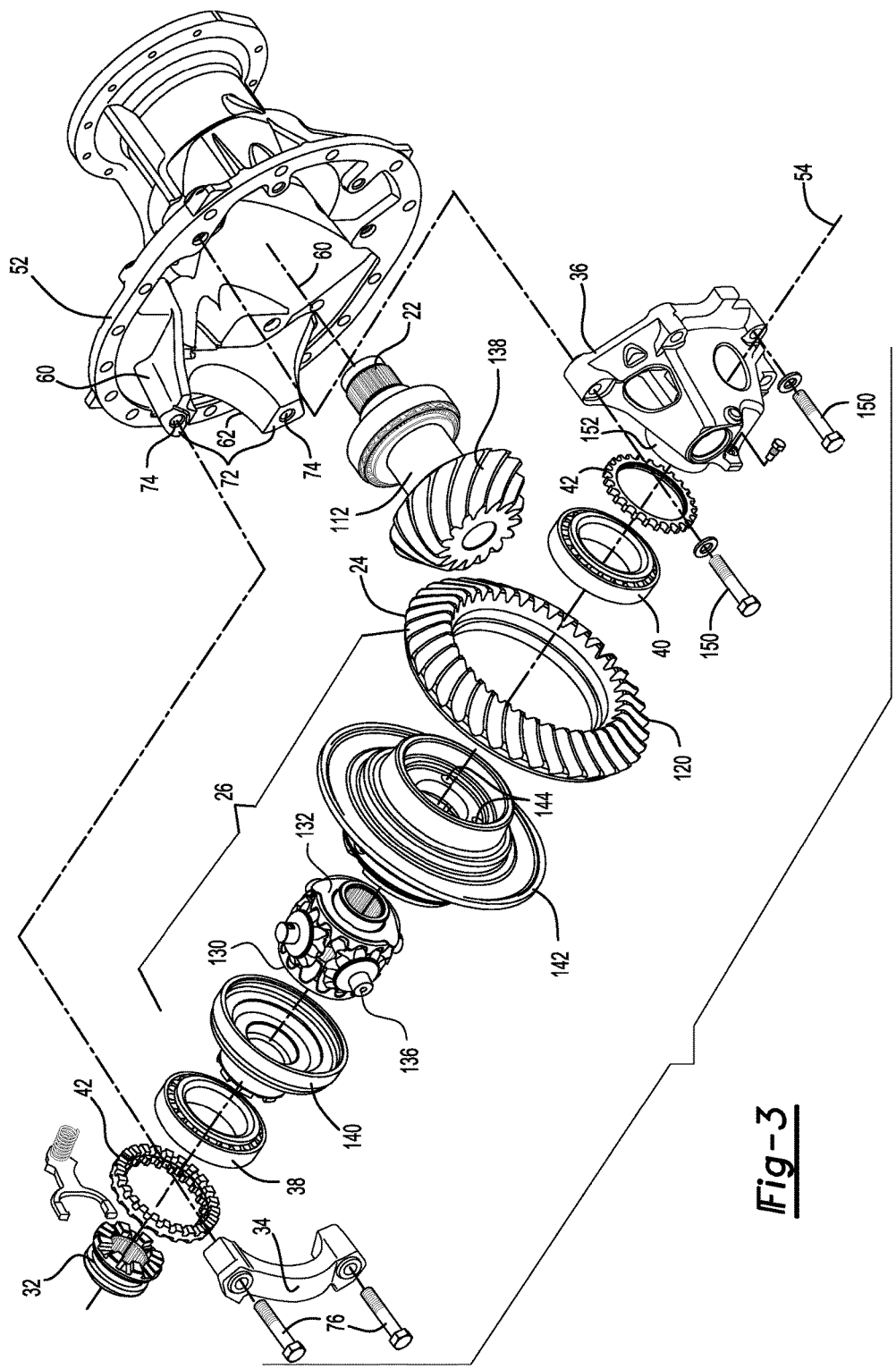
FIG. 3 is an exploded view showing the differential carrier and associated components.

As is best shown with reference to FIGS. 1-3, the axle assembly 10 may include a housing assembly 20, an input shaft 22, a ring gear 24, a differential unit 26, a first axle shaft 28, a second axle shaft 30, a clutch collar 32, a bearing cap 34, a bearing support 36, a first roller bearing assembly 38, a second roller bearing assembly 40, and one or more adjuster rings 42.

Referring to FIG. 1, the housing assembly 20 may receive various components of the axle assembly 10. In addition, the housing assembly 20 may facilitate mounting of the axle assembly 10 to the vehicle. In at least one embodiment, the housing assembly 20 may include an axle housing 50 and a differential carrier 52.

The axle housing 50 may receive the first axle shaft 28 and the second axle shaft 30 and may support corresponding wheel assemblies. The axle housing 50 may include a center portion and a pair of arm portions. The center portion may define an opening that may face toward the differential carrier 52 and may have a cavity that may receive at least a portion of the differential unit 26. The differential unit 26 may be configured to transmit torque to associated traction wheel assemblies via the first axle shaft 28 and the second axle shaft 30 and permit the traction wheel assemblies associated with the axle assembly 10 to rotate at different velocities.

The differential carrier 52 may be mounted on the axle housing 50. For example, the differential carrier 52 may be mounted on the center portion of the axle housing 50 with a plurality of fasteners, such as bolts. As is best shown in FIGS. 2 and 3, the differential carrier 52 may support the differential unit 26, which may rotate about an axis 54. The differential carrier 52 may include a first leg 60, a second leg 62, and a side wall 64. The differential carrier 52 may also at least partially define a lubricant reservoir 66.

Figure 4:
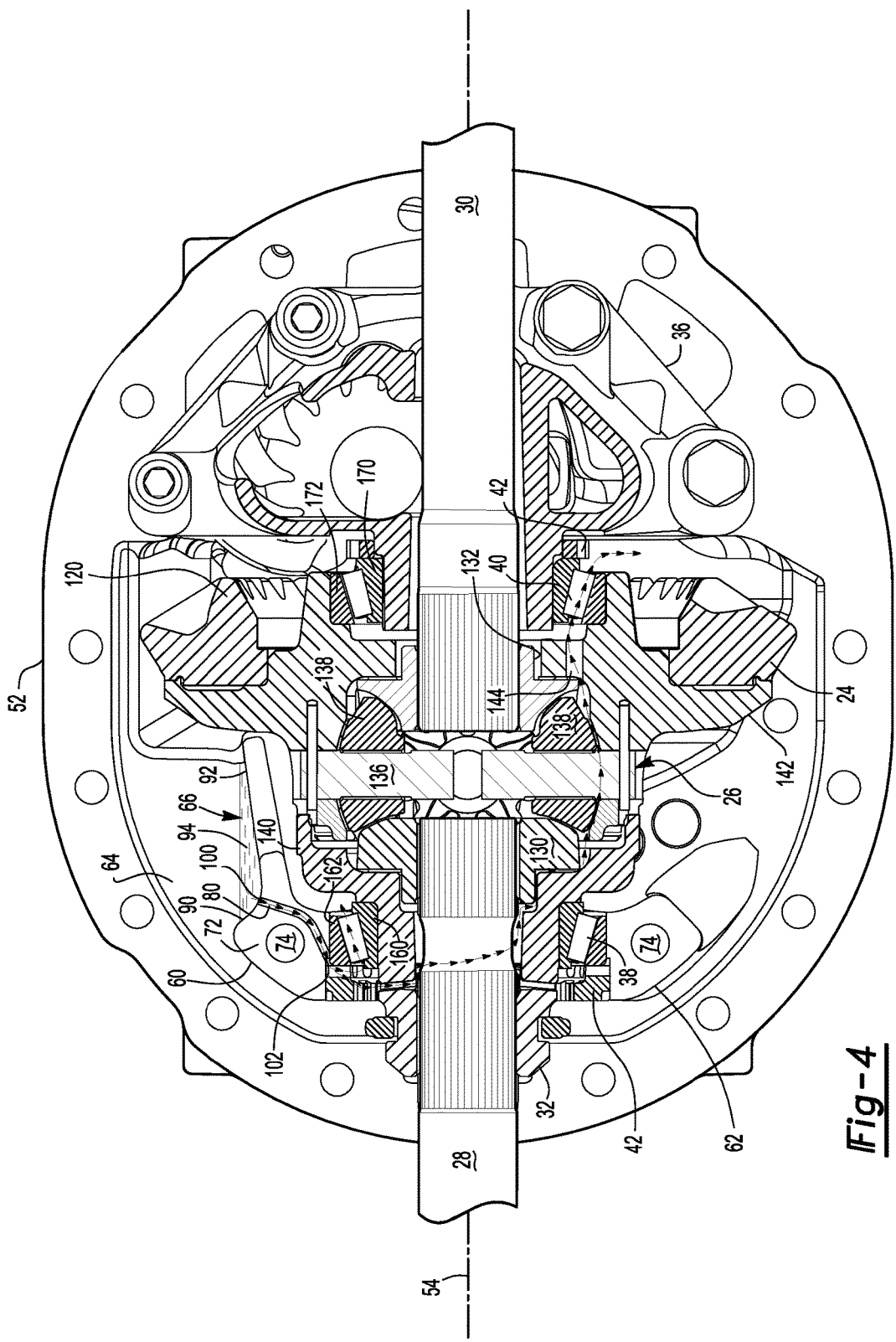
FIG. 4 is a section view of the axle assembly along section line 4-4.

Referring to FIGS. 2 and 3, the first leg 60 and the second leg 62 may extend from the side wall 64 of the differential carrier 52. The first leg 60 and the second leg 62 may cooperate to at least partially define an opening 70 that receives the first roller bearing assembly 38. As is best shown in FIGS. 3 and 4, the first leg 60 and the second leg 62 may each have an end surface 72 that may be disposed opposite the side wall 64. The end surface 72 may face toward and may engage the bearing cap 34. A fastener hole 74 may be provided in the end surface 72. For instance, a fastener hole 74 may be provided in the end surface 72 of the first leg 60 and another fastener hole 74 may be provided in the end surface 72 of the second leg 62. Each fastener hole 74 may receive a fastener 76, such as a bolt, that may couple the bearing cap 34 to a leg.

The side wall 64 may be disposed at the base of the first leg 60 and the second leg 62 and may generally extend over the opening in the axle housing 50. The side wall 64 may facilitate mounting of components to the differential carrier 52 and may facilitate mounting of the differential carrier 52 to the axle housing 50.

Referring to FIGS. 3 and 4, the first leg 60 may be disposed directly above the second leg 62 and may be disposed on opposite sides of the axis 54. The first leg 60 may at least partially define the lubricant reservoir 66 and a lubricant passage 80, which are best shown in FIG. 4. For instance, the first leg 60 may have an upper side or top side that may be contoured to form at least a portion of the lubricant reservoir 66. The upper side may face toward the top of the differential carrier 52 and may face away from the second leg 62. In at least one embodiment, the upper side may include a first ramp surface 90 and a second ramp surface 92.

The first ramp surface 90 may extend from the side wall 64 to the end surface 72 of the first leg 60. The first ramp surface 90 may also extend upward and away from the axis 54. More specifically, the first ramp surface 90 may extend from the second ramp surface 92 in a direction that extends away from the ring gear 24. As such, the first ramp surface 90 may extend above the fastener hole 74 in the first leg 60. In addition, the top end of the first ramp surface 90 may be located further above the axis 54 than the second ramp surface 92. As such, the first ramp surface 90 may extend further from the axis 54 than the second ramp surface 92.

The second ramp surface 92 may also extend from the side wall 64 to the end surface 72 of first leg 60. In addition, the second ramp surface 92 may extend upward and away from the axis 54 and away from the first ramp surface 90. More specifically, the second ramp surface 92 may extend from the first ramp surface 90 in a direction that extends toward the ring gear 24. Moreover, the second ramp surface 92 may have a greater length than the first ramp surface 90 to provide additional surface area near the ring gear 24 to catch lubricant 94 that is splashed by the ring gear 24 when the ring gear 24 rotates.

The lubricant reservoir 66 may temporarily receive lubricant 94 that is splashed by the ring gear 24. As is best shown in FIG. 2, the lubricant reservoir 66 may be disposed directly above the differential unit 26 and may be defined by the bearing cap 34, the first leg 60, and the side wall 64. More specifically, the lubricant reservoir 66 may be defined by the side wall 64 of the differential carrier 52, an end wall of the bearing cap 34 that may be disposed opposite the side wall 64, and the first ramp surface 90 and the second ramp surface 92 of the first leg 60.

Referring to FIG. 4, the lubricant passage 80 may route lubricant from the lubricant reservoir 66 to the first roller bearing assembly 38 and the differential unit 26. The lubricant passage 80 may be completely or partially disposed in the first leg 60. For instance, the lubricant passage 80 may be a drilled or cored hole that may be completely defined within the first leg 60. Alternatively, the lubricant passage 80 may be defined by the first leg 60 and the bearing cap 34. For example, the lubricant passage 80 may be a groove that may be provided in the end surface 72 that may extend away from the bearing cap 34, a groove that may be provided in the bearing cap 34 adjacent to the end surface 72, or may be defined by adjacent grooves in the end surface 72 and the bearing cap 34. In these configurations, the bearing cap 34 and the first leg 60 may cooperate to define the lubricant passage 80. It is also contemplated that multiple lubricant passages may be provided.

As is best shown in FIG. 4, the lubricant passage 80 may be spaced apart from and may not intersect the fastener hole 74 in the first leg 60. For instance, the lubricant passage 80 may be routed around the fastener hole 74 such that the lubricant passage 80 may be disposed between the fastener hole 74 and the first roller bearing assembly 38. In addition, the lubricant passage 80 or a portion thereof may extend along a curve or arc.

The lubricant passage 80 may have an inlet 100 and an outlet 102. The inlet 100 may be disposed near or at the bottom of the lubricant reservoir 66. For instance, the inlet 100 may be disposed where the first ramp surface 90 meets the second ramp surface 92 or where the first ramp surface 90, the second ramp surface 92 and the end surface 72 intersect.

The outlet 102 may be disposed adjacent to the first roller bearing assembly 38. For instance, the outlet 102 may be disposed adjacent to an outer race of the first roller bearing assembly 38. As such, the first roller bearing assembly 38 may be disposed between the outlet 102 and the differential unit 26. The outlet 102 may be axially positioned such that the outlet 102 is disposed at an end of the first roller bearing assembly 38 that is located opposite the ring gear 24 and internal components of the differential unit 26. For instance, the outlet 102 may be disposed between the first roller bearing assembly 38 and an adjuster ring 42 that may be disposed adjacent to the first roller bearing assembly 38.

Referring to FIGS. 1 and 2, the input shaft 22 may receive torque from a power source. For example, the input shaft 22 may be operatively coupled to a transmission, a transfer case, or another axle assembly that may receive torque from a motor or engine. In at least one embodiment, the input shaft 22 may extend along and may rotate about an input axis 110. As is best shown in FIG. 2, the input shaft 22 may be operatively connected to the ring gear 24 via a pinion gear or drive pinion 112 that may provide torque to the ring gear 24.

Referring to FIG. 2, the ring gear 24 may be configured to rotate about the axis 54. The ring gear 24 may have a center hole and a set of teeth 120. The center hole may extend around the axis 54. The set of teeth 120 may be arranged around the center hole and may engage and mate with corresponding teeth on the drive pinion 112. As is best shown in FIG. 4, the set of teeth 120 may face away from or extend away from the lubricant reservoir 66. The ring gear 24 may be mounted on the case of the differential unit 26.

Referring to FIGS. 3 and 4, the differential unit 26 may be disposed in the housing assembly 20. The differential unit 26 may be rotatably supported by the first roller bearing assembly 38 and the second roller bearing assembly 40. The differential unit 26 may be configured to control rotation of the first axle shaft 28 with respect to the second axle shaft 30. For example, the differential unit 26 may permit the first and second axle shafts 28, 30 to rotate at different speeds or inhibit the first and second axle shafts 28, 30 from rotating at different speeds depending on the position of the clutch collar 32. In at least one embodiment, the differential unit 26 may include a first output gear 130, a second output gear 132, a differential case 134, a spider 136, and one or more pinion gears 138.

The first output gear 130 may be disposed on the first axle shaft 28 and may rotate with the first axle shaft 28. The first output gear 130 may include a set of teeth that may be arranged on a side or face of the first output gear 130 that faces toward the spider 136 and one or more pinion gears 138.

The second output gear 132 may be disposed opposite the first output gear 130. The second output gear 132 may be disposed on the second axle shaft 30 and may rotate with the second axle shaft 30. The second output gear 132 may also include a set of teeth that may be arranged on a side or face of the second output gear 132 that faces toward the spider 136 and one or more pinion gears 138.

The differential case 134 may receive various components of the differential unit 26. In addition, the differential case 134 may be rotatably supported by the first roller bearing assembly 38 and the second roller bearing assembly 40 such that the differential case 134 may rotate about the axis 54. In at least one embodiment, the differential case 134 may include a first case portion 140 and a second case portion 142.

The first case portion 140 may be received in and may be rotatably supported by the first roller bearing assembly 38. The first case portion 140 may include an opening that may extend around the axis 54 and that may receive a portion of the first axle shaft 28 and/or the first output gear 130.

The second case portion 142 may be fixedly disposed on the first case portion 140. The second case portion 142 may support the ring gear 24. For example, the ring gear 24 may be fixedly disposed on the second case portion 142. In addition, the second case portion 142 may receive and may be rotatably supported by the second roller bearing assembly 40. As such, the ring gear 24 and the second case portion 142 may rotate together about the axis 54. The second case portion 142 may include an opening that may extend around the axis 54 and that may receive a portion of the second axle shaft 30 and/or the second output gear 132. In addition, the second case portion 142 may have at least one lubricant outlet hole 144 that may extend through the second case portion 142 toward the second roller bearing assembly 40. In the embodiment shown in FIG. 3, four lubricant outlet holes 144 are provided that are positioned at 90 degree intervals; however, it is contemplated that a greater or lesser number of lubricant outlet holes 144 may be provided. The lubricant outlet holes 144 may be radially disposed about the axis 54 and may provide lubricant to the second roller bearing assembly 40 as will be discussed below in more detail.

The spider 136 may be disposed in the differential case 134 and may be configured to rotate about the axis 54 with the differential case 134. The spider 136 may include one or more pins that may be received in the differential case 134. Each pin may support a pinion gear 138.

A pinion gear 138 may be rotatably disposed on each pin of the spider 136. The pinion gear 138 may include a set of teeth that mate with the first output gear 130 and the second output gear 132.

Referring to FIG. 4, the first axle shaft 28 may help connect the axle assembly 10 to a vehicle wheel. The first axle shaft 28 and the second axle shaft 30 may extend in opposite directions along the axis 54.

The second axle shaft 30 may extend along the axis 54 and may help connect the axle assembly 10 to another vehicle wheel.

Referring to FIGS. 3 and 4, the clutch collar 32 may slide axially along the second axle shaft 30 to engage or disengage the differential case 134 and lock or unlock the differential unit 26. The clutch collar 32 may be operatively connected to an actuator that may actuate the clutch collar 32.

Referring to FIGS. 2 and 3, the bearing cap 34 may help retain the first roller bearing assembly 38. More specifically the bearing cap 34 may be disposed on the first leg 60 and the second leg 62 of the differential carrier 52 and may cooperate with the first leg 60 and the second leg 62 to define the opening 70 that receives the first roller bearing assembly 38. For example, the bearing cap 34 may extend generally along an arc from the first leg 60 to the second leg 62 and may engage the outer race of the first roller bearing assembly 38. Moreover, the bearing cap 34 may engage the end surfaces 72 of the first and second legs 60, 62 and may have holes that receive the fasteners 76 to facilitate coupling of the bearing cap 34 to the first and second legs 60, 62.

Referring to FIGS. 2-4, the bearing support 36 may be disposed on the housing assembly 20 and may support the first roller bearing assembly 38. As is best shown in FIG. 2, the bearing support 36 may be mounted to the differential carrier 52 with one or more fasteners 150, such as bolts. As is best shown in FIG. 3, the bearing support 36 may have a bearing journal 152 that may support the second roller bearing assembly 40 and that may have a through hole through which the second axle shaft 30 may extend.

Referring primarily to FIG. 4, the first roller bearing assembly 38 may extend around the axis 54 and may rotatably support the differential unit 26. The first roller bearing assembly 38 may include a plurality of rolling elements, such as balls or rollers, which may be disposed between a first inner race 160 and a first outer race 162. The first inner race 160 may be disposed on and may engage the first case portion 140 of the differential case 134 of the differential unit 26. The first outer race 162 may be disposed opposite and may extend around the first inner race 160. The first outer race 162 may engage the first leg 60 and the second leg 62 of the differential carrier 52 and the bearing cap 34.

The second roller bearing assembly 40 may also extend around the axis 54 and may rotatably support the differential unit 26. The second roller bearing assembly 40 may include a plurality of rolling elements, such as balls or rollers, which may be disposed between a second inner race 170 and a second outer race 172. The second inner race 170 may be disposed on and may extend around the bearing journal 152. The second outer race 172 may be disposed opposite and may extend around the second inner race 170. The second outer race 172 may be disposed proximate and may engage the second case portion 142 of the differential case 134 of the differential unit 26. As such, the second outer race 172 may support the differential unit 26 and the ring gear 24.

Referring to FIGS. 3 and 4, one or more adjuster rings 42 may be provided to help axially position and exert force on a roller bearing assembly. In FIG. 3, two adjuster rings 42 are shown. Each adjuster ring 42 may extend continuously around the axis 54. One adjuster ring 42 may be disposed in the opening 70 and may be configured to engage the first outer race 162 on a side of the first roller bearing assembly 38 that is disposed opposite the differential case 134. The other adjuster ring 42 may be disposed on the bearing journal 152 and may be configured to engage the second inner race 170 on a side of the second roller bearing assembly 40 that is disposed opposite the differential case 134. The adjuster rings 42 may be threaded to permit axial positioning of each adjuster ring 42 and the preload force exerted on a roller bearing assembly to be set by rotating the adjuster ring 42 about the axis 54 in one or more embodiments. In addition, the adjuster rings 42 may have one or more openings that may facilitate the flow of lubricant. For example, an opening may be at least partially defined by protrusions or teeth that may extend from a side of the adjuster ring 42 toward an adjacent roller bearing assembly. As such, lubricant may flow through one or more openings to reach and enter the first case portion 140 of the differential case 134.

Referring to FIG. 4, the flow of lubricant 94 is illustrated with dashed arrowed lines. Some lubricant that is splashed by the ring gear 24 may collect in the lubricant reservoir 66, either by being directly splashed into the lubricant reservoir 66 or by flowing down or dripping from internal surfaces of the housing assembly 20 into the lubricant reservoir 66. Lubricant that collects in the lubricant reservoir 66 may pass through the lubricant passage 80 and exit at the outlet 102. The lubricant may then enter and lubricate the first roller bearing assembly 38 and/or may enter the differential case 134 by entering the opening 70 in the first case portion 140. The lubricant may then lubricate components of the differential unit 26. Lubricant may flow around the first output gear 130 and collect or pool in the bottom of the differential case 134 when the differential unit 26 is not rotating about the axis 54. Lubricant may exit the differential case 134 via one or more lubricant outlet holes 144, which may direct the lubricant to the second roller bearing assembly 40. Lubricant that lubricates the second roller bearing assembly 40 may then flow down into the sump portion at the bottom of the housing assembly 20. As such, the lubricant reservoir 66 and routing of lubricant may help provide lubricant to the differential unit 26 and its supporting roller bearing assemblies without partially immersing such components in lubricant that pools in the sump portion, which in turn may allow the level of lubricant in the sump portion to be lowered to reduce churning losses and to allow the axle assembly to operate more efficiently, which may help reduce fuel consumption.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a differential carrier having a first leg and a second leg that cooperate to partially define an opening that receives a first roller bearing assembly, wherein the first leg at least partially defines a lubricant reservoir and a lubricant passage that is disposed in the first leg and extends from the lubricant reservoir to the opening;
   a bearing cap that is disposed on the first leg and the second leg and that cooperates with the first leg and the second leg to define the opening; and
   a differential unit that has a differential case that is rotatably supported by the first roller bearing assembly to allow the differential case to rotate about an axis;
   wherein lubricant in the lubricant reservoir passes through the lubricant passage to lubricate the first roller bearing assembly and to enter the differential case to lubricate the differential unit.

2. The axle assembly of claim 1 wherein the lubricant passage is defined by the first leg and the bearing cap.

3. The axle assembly of claim 2 wherein the first leg has an end surface that faces toward and engages the bearing cap, wherein the lubricant passage is a groove in the end surface that extends away from the bearing cap.

4. The axle assembly of claim 1 wherein the first leg has a fastener hole that receives a fastener that couples the bearing cap to the first leg, wherein the lubricant passage is disposed between the fastener hole and the first roller bearing assembly.

5. The axle assembly of claim 1 wherein the lubricant passage has an inlet disposed proximate a bottom of the lubricant reservoir and an outlet disposed adjacent to the first roller bearing assembly.

6. The axle assembly of claim 5 wherein the outlet is disposed adjacent to an outer race of the first roller bearing assembly such that the first roller bearing assembly is disposed between the outlet and the differential case.

7. The axle assembly of claim 5 wherein the outlet is disposed between the first roller bearing assembly and an adjuster ring that is received in the opening and that exerts a preload force on the first roller bearing assembly.

8. An axle assembly comprising:
   a differential carrier having a first leg and a second leg that extend from a side wall and that cooperate to partially define an opening that receives a first roller bearing assembly, wherein the first leg is disposed above the second leg and at least partially defines a lubricant reservoir and a lubricant passage that extends from the lubricant reservoir to the opening;
   a bearing cap that is disposed on the first leg and the second leg and that cooperates with the first leg and the second leg to define the opening;
   a bearing support that is disposed on the differential carrier, wherein a second roller bearing assembly is disposed on the bearing support; and
   a differential unit that is operatively coupled to a first axle shaft and a second axle shaft that rotate about an axis and are each adapted to support a corresponding wheel, wherein the differential unit compensates for rotational speed differences between the first axle shaft and the second axle shaft and has a differential case that is rotatably supported by the first roller bearing assembly and the second roller bearing assembly and that has a lubricant outlet hole disposed adjacent to the second roller bearing assembly;
   wherein lubricant in the lubricant reservoir passes through the lubricant passage to enter the first roller bearing assembly and the differential case and lubricant exits the differential case through the lubricant outlet hole to lubricate the second roller bearing assembly.

9. The axle assembly of claim 8 wherein the lubricant reservoir is disposed directly above the differential case.

10. The axle assembly of claim 8 further comprising a ring gear disposed on the differential case, wherein the lubricant reservoir receives lubricant that is splashed by the ring gear.

11. The axle assembly of claim 10 wherein teeth of the ring gear face away from the lubricant reservoir.

12. The axle assembly of claim 10 wherein the first leg has a first ramp surface and a second ramp surface that extend from the side wall to the bearing cap, wherein the first ramp surface and the second ramp surface extend away from the axis and partially define the lubricant reservoir.

13. The axle assembly of claim 12 wherein the lubricant passage has an inlet that is located where the first ramp surface meets the second ramp surface.

14. The axle assembly of claim 12 wherein the bearing cap has an end wall that is disposed opposite the side wall of the differential carrier, wherein the end wall extends away from the axis and upward from the first ramp surface and the second ramp surface.

15. The axle assembly of claim 14 wherein the lubricant reservoir is defined by the side wall of the differential carrier and the end wall, first ramp surface, and the second ramp surface of the first leg.

16. The axle assembly of claim 12 wherein the first ramp surface extends away from the axis in a direction that extends away from the ring gear and toward the second ramp surface.

17. The axle assembly of claim 16 wherein the second ramp surface extends away the axis in a direction that extends toward the ring gear, wherein the first ramp surface extends further from the axis than the second ramp surface.

18. The axle assembly of claim 8 wherein the differential case has a first case portion that is disposed on the first roller bearing assembly and a second case portion that is disposed on the second roller bearing assembly, wherein the lubricant outlet hole extends through the second case portion.

19. The axle assembly of claim 8 wherein a plurality of lubricant outlet holes is arranged around the axis and extends substantially parallel to the axis.

* * * * *